Patented June 10, 1947

2,422,000

UNITED STATES PATENT OFFICE 2,422,000

METHOD OF PREPARING SULFOALKYL ETHERS OF CELLULOSE

Joseph B. Dickey, Rochester, N. Y., and James G. McNally, Oak Ridge, Tenn., assignors to Eastman Kodak Company, Rochester, N. Y., a corporation of New Jersey No Drawing. Application October 12, 1944, Serial No. 558,456

7 Claims. (Cl. 260—231)

This invention relates to the preparation of sulfoalkyl ethers of cellulose by reacting upon cellulose with ethionic acid, its anhydride, carbyl sulfate, or its salt.

In recent years compounds having sulfo groups have become of interest because of their decided wetting properties. In few, if any, of these materials, however, has the cellulose unit been employed in the combination. In those cases in which sulfo groups have been introduced into cellulose, various difficulties were often encountered in carrying out the reaction process.

One object of our invention is to provide a readily operated and inexpensive process for preparing water-soluble cellulose derivatives. Another object of our invention is to provide a method for preparing compounds useful for use in sizing fibers or as wetting agents for various purposes. Other objects will appear herein.

We have found that cellulose, preferably in the form of soda cellulose, regenerated cellulose, or partially alkylated cellulose may be readily reacted with ethionic acid, its anhydride, or its salt to form a sulfoalkyl ether of cellulose. The reaction takes place readily, particularly at an alkaline pH such as of 8 or more, and the resulting product contains sulfoalkyl ether groups, the amount of which may be varied as desired by the individual operator being governed by the proportion of ethionic acid or its anhydride which is employed in the operation. The temperature which is employed in preparing sulfoalkyl ethers in accordance with our invention is not critical although an elevated temperature will promote the progress of the reaction and it is desirable in practical operations to operate within the temperature range of 50° to 170° C.

The ethionic acid

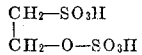

or its anhydride employed in preparing cellulose derivatives in accordance with our process may be prepared by any of the methods described in the prior art for their preparation. The preparation of both of these compounds is described in "The Chemistry of Petroleum Derivatives," by Carleton Ellis, copyright 1934. The proportion of carbyl sulfate or ethionic acid which is employed in the reaction with cellulose is not critical and may be varied depending upon the proportion of sulfo groups which it is desired to introduce into the cellulose. In order to obtain a substantial proportion of sulfo groups, it is desirable that the proportion of ethionic acid or its anhydride be at least chemically equivalent to the amount of cellulose which is employed. The following examples illustrate the preparation of cellulose derivatives in accordance with our invention.

Example 1

One hundred gm. cotton linters are suspended in pyridine and carbyl sulfate.

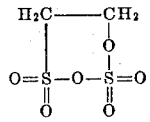

was added thereto with stirring in the cold. After several hours the mass was warmed slowly to 90–100° C. and was then neutralized with sodium bicarbonate. The product obtained was poured into water. The resulting sulfoalkyl ether of cellulose showed by analysis about one $$O-CH_2-CH_2-SO_3H$$

group per glucose unit.

Example 2

One hundred gm. of soda cellulose which had been alkylated so as to contain 1 ethyl group per glucose residue was heated in an autoclave with 100 gm. of the sodium salt of ethionic acid for an hour at 150° C. A water-soluble cellulose ether containing one ethyl and one sulfoethyl group per glucose unit was obtained. The reaction is facilitated by using a solvent or diluent such as water, dioxane, chloroform, pyridine et cetera.

The following examples illustrate the preparation of derivatives from the sulfoalkyl cellulose derivatives prepared in accordance with our invention.

Example 3

Five gm. of a cellulose ether containing one β-sulfoethyl group per glucose residue prepared in accordance with our invention was heated at 130° C. for 5 hours with a mixture of 100 gm. of pyridine, 100 gm. dichlorobenzene and 12 gm. of acetyl chloride. The resulting gel was diluted with methanol and acetone and was isolated by pouring into methanol. The product was purified with extraction with ether. It was found to contain both acetyl and sulfoethyl groups therein.

Example 4

Ten gm. of cellulose mono-β-sulfopropylether was mixed with 100 cc. of acetic acid containing 1 gm. of phosphoric acid and 0.5 gm. of sulfuric acid. Fifteen gm. of acetic anhydride was then added thereto and the mixture was heated to 40-45° C. The reaction was complete in two hours and the resulting product was poured into water and neutralized. A product containing both acetyl and ether groups was obtained.

We claim:

1. A method of preparing sulfoalkyl ethers of cellulose which comprises reacting upon cellulose with a compound selected from the group consisting of ethionic acid, carbyl sulfate, and the salts of ethionic acid.

2. A method of preparing a sulfoalkyl ether of cellulose which comprises reacting upon cellulose in suspension in a liquid with ethionic acid.

3. A method of preparing a sulfoalkyl ether of cellulose, which comprises reacting upon soda cellulose with ethionic acid.

4. A method of preparing a sulfoalkyl ether of cellulose, which comprises reacting upon cellulose with carbyl sulfate.

5. A method of preparing sulfoalkyl ethers of cellulose, which comprises treating cellulose at a temperature within the range of 50-170° C. with a compound selected from the group consisting of ethionic acid, carbyl sulfate and the salts of ethionic acid.

6. A method of preparing a sulfoalkyl ether of cellulose which comprises reacting upon cellulose in suspension in a liquid with carbyl sulfate.

7. A method of preparing a sulfoalkyl ether of cellulose which comprises treating cellulose at a temperature of 90-100° C. with carbyl sulfate.

JOSEPH B. DICKEY.
JAMES G. McNALLY.

REFERENCES CITED

The following references are of record in the file of this patent:

UNITED STATES PATENTS

| Number | Name | Date |
|---|---|---|
| 2,148,554 | Neugebauer et al. | Feb. 28, 1939 |
| 2,132,181 | Neugebauer et al. | Oct. 4, 1938 |

OTHER REFERENCES

Hackh's Chemical Dictionary, 2d ed., Blakiston 1937.